Sept. 11, 1962  G. G. LANDIS ETAL  3,053,966
METAL CUTTING BY MEANS OF ELECTRIC ARC
Filed April 11, 1955  2 Sheets-Sheet 1

*INVENTORS.*
GEORGE G. LANDIS,
JOHN M. PARKS &
BY JOHN E. FORSS.

ATTORNEY

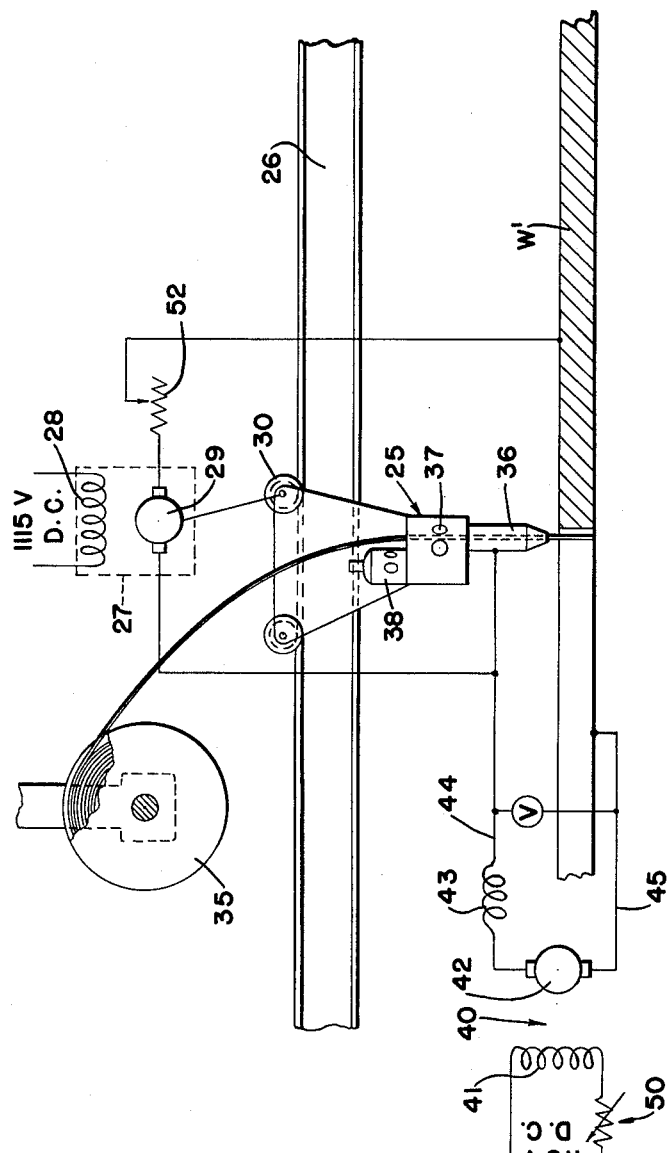

United States Patent Office 3,053,966
Patented Sept. 11, 1962

3,053,966
METAL CUTTING BY MEANS OF ELECTRIC ARC
George G. Landis, South Euclid, Ohio, John M. Parks, Summit, N.J., and John E. Forss, Chicago, Ill., assignors to The Lincoln Electric Company, Cleveland, Ohio, a corporation of Ohio
Filed Apr. 11, 1955, Ser. No. 500,328
12 Claims. (Cl. 219—69)

The present improvements, as indicated, relate to the use of the electric arc for the purpose of cutting metal parts such as sheets, plates, and the like, for example. The present application is a continuation in part of our copending patent application Serial No. 178,496 filed August 9, 1950, now abandoned.

In the original employment of the electric, or so-called voltaic, arc for the purpose of working metals it was recognized that such arc might be used for the purpose either of joining or that of separating metals (see Patent No. 363,320 to N. De Benardos & S. Olszewski dated May 17, 1887). Thus while the disclosure of the patent just cited for the most part relates to the use of such arc for joining or welding metal parts together, it also illustrates and describes the manner in which holes may be bored in metals by means of an electric arc. Obviously, instead of forming spaced holes, a continuous separation can be equally well effected by the procedure described in said patent.

While, as a result of improvements subsequently made during the years which have intervened since the original discovery of De Benardos & Olszewski the use of arc welding has become an important and well established production factor in many fields of industry, where such method has had to compete with the oxyacetylene torch and other methods of welding using heat from a burning mixture of suitable gases, nevertheless such progress has been lacking in the use of the arc to cut or sever metal parts. In other words, in this field the oxyacetylene and like gas burning torches have been preferred in such use down to the present day.

One reason for this preference has undoubtedly been the difficulty encountered in making a narrow, clean cut along a defined line by means of the electric arc. Also where the part to be cut is of considerable thickness, the degree of penetration, i.e. the depth to which the metal can be melted away by a single passage of the arc, has been limited and the edges along the line of cut not only slope away from the line of cut, but tend to be irregular.

Due to the foregoing, use of the electric arc as a cutting instrumentality has been largely if not entirely confined to the cutting of metal objects into parts, where it is not important to leave clean cut, approximately rectangular, edges along the line of severance, e.g. for cutting up scrap. Ordinarily such arc cutting has been done with the carbon arc, and while coated metallic electrodes have been used, the current employed has been the same as in conventional arc welding, and the cutting speed has not exceeded ten to twelve inches per minute.

As a result of extensive studies to determine the true nature of the electric arc, particularly where a metallic electrode is employed, we have discovered certain characteristics which, properly controlled, it has been found, greatly improve the metal cutting capacity of the arc and at the same time make it possible to leave the edges of the severed parts in even better condition than can be obtained by use of the latest improved oxyacetylene or other gas torch. In particular, we have discovered that under properly controlled conditions a vapor jet is formed in the arc and that such jet not only exhibits greatly increased penetrating capacity over that due to the action of the arc proper, but also permits the melting action to be more narrowly confined than has ever heretofore been possible with the electric arc. The latter thus may be made into a highly efficient metal cutting tool.

In particular, such improved form of arc keeps the surface of the metal exposed and has a very high heat input. Hence it will cut any metal or alloy, regardless of its thermal diffusibility, or tendency to form oxides.

The principal object of the invention is the provision of a new and improved method and apparatus for cutting metals using an electric arc and a consumable electrode which enables all metals to be cut, including copper, the stainless steels and the like, which gives a very high cutting rate, which makes clean cuts, which effects the side of the cut to a minimum depth, which is self-regulating in operation, and which can be a fully automatic operation.

Another object of the invention is the provision of new and improved apparatus for cutting metals using a consumable electrode wherein means are provided for moving the electrode sidewardly in the desired direction of the cut at a speed proportional to the arc voltage, whereby the optimum spacing of the electrode on the apex of the cut is continuously maintained.

Still another object of the invention is the provision of new and improved apparatus of the type described wherein the electrode is moved sidewardly in the direction of the cut in such a manner that an arc is always maintained between the leading side of the electrode and the apex of the cut.

Another object of the invention is the provision of a new and improved method of cutting metals using an electric arc and a consumable electrode wherein the electrode is moved sidewardly in the direction of the cut while maintaining an arc between the leading side of the electrode and the apex of the cut, while simultaneously advancing the electrode along its length to replace the electrode as it is consumed.

Still another object of the invention is the provision of a new and improved electric arc cutting wherein the electrode is moved in such a manner and energized in such a manner that its metal is vaporized to have an extremely high heat content which then passes to the workpiece and gives up its heat to the workpiece to assist the arc in melting away the workpiece.

To the accomplishment of the foregoing and related ends, said invention, then, consists of the steps hereinafter fully described and particularly pointed out in the claims.

The annexed drawing and the following description set forth in detail one approved method of carrying out the invention, such disclosed method, however, constituting but one of the various ways in which the principle of the invention may be used.

Figure 2:
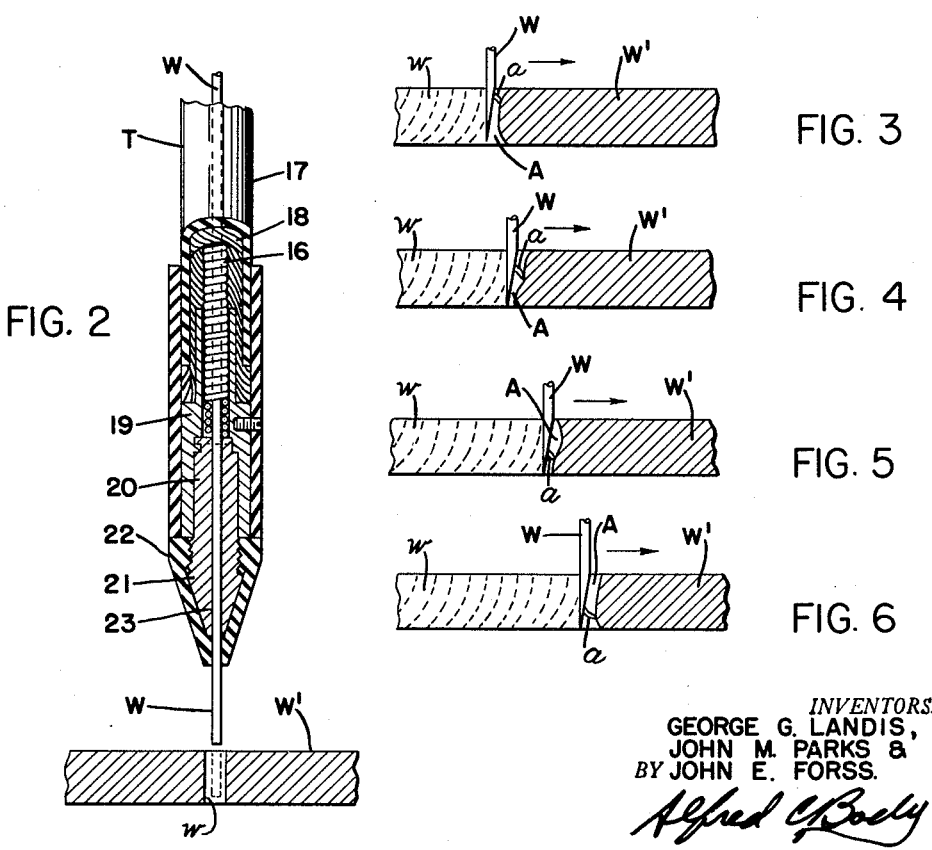
FIGURE 2 is a sectional view on actual scale of a portion of such apparatus, the plane of the section being indicated by the line 2—2 FIGURE 1.
Figure 3:
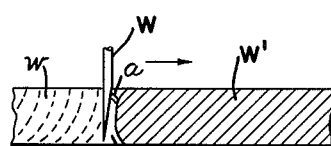

FIGURES 3, 4, 5, 6 are diagrammatic representations of a metal cutting arc, such as may be obtained by use of the aforesaid apparatus, as viewed from the side, i.e. at right angles to the plane of FIGURE 2, the successive figures of the series showing successive operative conditions; and FIGURE 7 is a diagrammatic representation of another illustrative apparatus embodying the present invention and suitable for carrying out our improved method of metal cutting by means of the electric arc.

Figure 1:
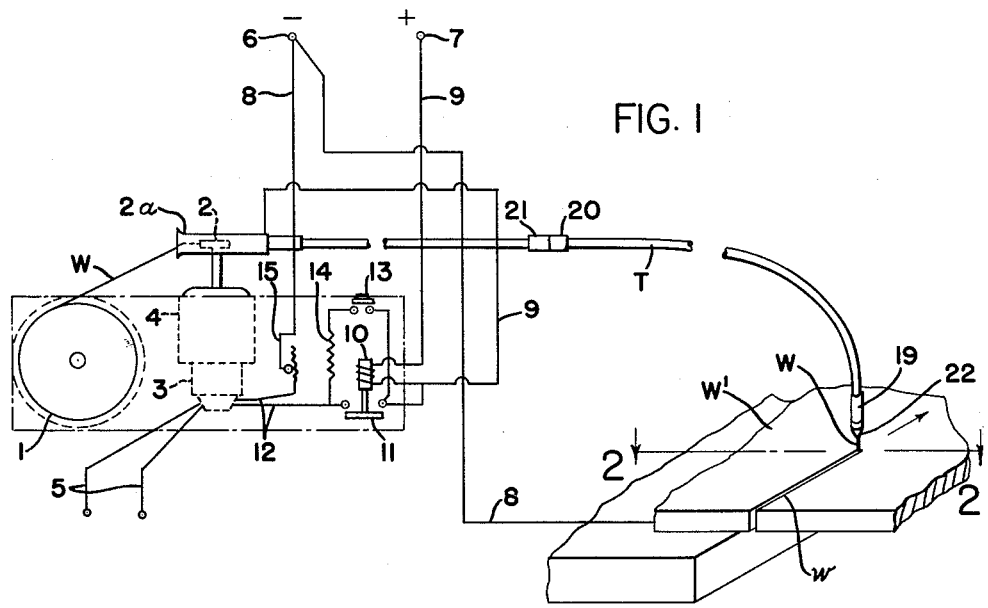
FIGURE 1 is a diagrammatic representation of one illustrative apparatus suitable for carrying out our improved method of metal cutting by means of the electric arc.

The illustrative apparatus shown in FIGURES 1 and 2 is designed to be used with a metallic electrode, preferably in the form of a weld rod or wire W of indefinite length and of much smaller diameter than is ordinarily used in arc welding processes, either manual or automatic. For example, such electrode, where composed of mild steel, may be as small as 1/16 or 3/32 inch in diameter. By imposing on such electrode a current of high amperage, e.g. current of approximately 500 amperes, a corresponding high current density of at least 60,000 amperes per square inch of normal electrode cross-section may be obtained.

Certain unique characteristics of the arc which may be obtained under the conditions thus preliminarily set forth will be explained in greater detail after setting forth the construction and operation of the illustrated apparatus.

Proceeding with the description of such apparatus, the gripping rolls 2 are driven by motor 3 through a reduction or change speed gear box whereby the rate of feed of the weld rod or wire W may be set for each of the several sizes or diameters of wire with which the apparatus is designed to be employed, and to meet other conditions of use as will be hereinafter set forth.

Current is supplied to the field of motor 3 through leads 5, from a source of current independent of that supplied to the electrode, e.g. from an ordinary 120 v. power line. The current supplied to the electrode may likewise be taken from any suitable source, e.g. from the terminals 6 and 7 of a machine (not shown) on the order of the machine commonly used to produce a welding current, i.e. direct current of from 25 to 45 volts and of comparatively high amperage, ranging from 500 amperes upwards.

Such machine will be provided with the usual means for varying the voltage and amperage of the current, as may be found desirable for any particular operation. However, it is not contemplated or necessary that any changes in the setting of such machine, in other words, of the current, will require to be made during the cutting operation, or in fact for any given set-up, i.e. any operation in which it has been determined at what rate the metallic rod or wire is to be fed to the work and the current appropriate for the particular operation has been selected.

One of the adjacent terminals, preferably the negative terminal 6, is connected by means of a lead 8 with the workpiece W', while the other, positive, terminal 7 is connected by means of a lead 9 with a conductor which forms a part of a flexible tubular guide T, it being through such guide that the wire W is continuously fed to the point where the arc cutting operation is carried out.

Operation of the motor 3 is tied in with the cutting operation by a series relay 10 which is operated by flow of current through the electrode lead 9 to close a switch 11 in one of the armature leads 12. In addition to this relay, there is included in such armature lead a pushbutton switch 13 which is adapted to connect the latter through a resistor 14. This last-mentioned switch is used to operate the motor to feed the wire when not cutting, for example in initially threading the wire through the tubular guide T. An adjustable resistor 15 will also be desirably included in the other such armature lead 12, to permit the armature current to be fed as desired.

The flexible tubular guide T is preferably, although not necessarily, composed of sections, and the construction thereof forms no part of the present invention. As illustrated (see FIGURE 2), it comprises a main guide element or liner 16 in the form of a coil of hardened steel wire or equivalent wear resisting material, through which the weld rod or wire directly passes when being fed to the work. Surrounding such inner tube is a conductor sheath 17 formed of multi-stranded fine copper wire assembled and twisted about said inner tube much as are the component strands in a wire cable, such conductor 17 being in turn surrounded with a heavy sheath 18 of rubber or equivalent flexible insulating material.

The end of the tube, constructed as thus described, is shown as entering an externally insulated tubular coupling member 19 to which the adjacent end of the conductor member 16 is electrically connected as by brazing.

Inasmuch as the resistance of the liner 16 will greatly exceed that of the conductor sheath 17 (the latter may have a conductance several hundred times greater than the former), the curernt will be substantially entirely carried by the sheath to the terminal fitting which is also illustrated in said FIGURE 2. This fitting comprises simply a tubular core 20, the outer end 21 of which is of conical form and is fitted with a sheath 22 of corresponding shape while the inner end is formed to have a bayonet or other detachable connection with the coupling 19. The core 20 is thus electrically connected through such coupling with the conductor sheath 17 and the bore 23 is of such diameter and longitudinal extent as to provide adequate electrical connection to the wire W as the latter passes therethrough. It will be understood that what has been referred to as the terminal portion or "stick-out" of the electrode or wire is the portion that projects beyond the end of the core.

It has been found that the wire as drawn from the reel and fed through the guide tube T will necessarily undulate sufficiently to press against the core 20 of the terminal fitting at a sufficient number of points to insure the free flow of current to its extremity and thus to the terminal portion or "stick-out" of the wire; i.e. no special contact shoes are required.

Where the electric arc is employed in welding metal parts together, the one objective of course is to bring the abutting edges of such parts to the proper welding temperature. Actually the temperature of the arc is so high that such edges are rendered molten and the resultant weld is formed by the interfusion of such molten metal with additional metal supplied from the electrode, where a metal electrode or weld rod is employed, or from introduction of a separate weld rod where a carbon electrode is utilized. Further, in arc welding the electrode, whether metallic or carbon, is preferably negative since in the case of the metallic electrode it will be thus melted down more rapidly than if positive and in the case of the carbon electrode the introduction of carbon into the weld metal is kept to a minimum, if not entirely prevented.

While it has been recognized that in welding by means of a metallic arc, i.e. an arc struck from a metallic electrode or weld rod, some of the metal of which the rod is composed will be vaporized, the transfer of metal from the electrode is substantially entirely in the form of molten metal. In other words, the electrode end melts off more rapidly than it evaporates, and a molten globule collects. Then, when the gravitational force exceeds the surface tension forces, the drop starts to leave the electrode, and as the connecting portion thereof contracts, or necks down, the current density in the constricted portion rapidly rises and such portion is disrupted with explosive force. This action shatters the drop, throws the spray toward the plate, and frequently causes undesirable "splatter" beyond the weld.

As a result of our investigation of the foregoing and related phenomena of the metallic arc, we have determined that by greatly increasing the arc current and wire feed speed so as to attain an arc of low voltage, thereby reducing the relative heat radiation loss from the end of the electrode, the ratio of metal evaporated to that melted off can be increased considerably. Thus by employing an apparatus such as hereinbefore described, and utilizing the high current densities thereby obtainable, the terminal portion of the electrode can be brought to the arc region at a relatively low temperature, and subsequently heated by the arc action to boiling temperatures. Such severe temperature gradients permit considerable volatilization with relatively less melting, thereby causing a considerably increased ratio of metal evaporated to that melted off.

A new and striking phenomenon is observable in that a bright beam extends between the end of the electrode and the workpiece; this beam actually takes the form of a strong, well defined jet.

Our conclusion is that such beam or jet consists essentially of a stream of volatilized metal within the boundary of the arc and that the metal of the electrode which is projected from the latter, is in major amount, if not substantially entirely, in this form instead of in the form of droplets as in the ordinary welding operation. This conclusion is fortified by the further discovery that an arc characterized by the presence of such vapor jet has much greater penetrating power, i.e. cutting action, than has ever heretofore been achieved in arc welding. Indeed, such jet we have found constitutes a superior metal cutting instrumentality.

Thus it has been found that the only limitation in the cutting speed on the low side is that if the rate of travel of the arc along the line to be cut is too low the arc will become so long that it can no longer be maintained by the usual cutting power supply. For example, it has been found that in cutting a hot ⅜ inch steel plate at 600 amperes, the best cutting speed could vary from 38 to 46 inches per minute; while at 800 amperes, such cutting speed could vary from 54 to 65 inches per minute.

Under proper conditions, not only may a metal plate or other part of considerable thickness be cut or severed at such indicated rapid rate, but, as illustrated in FIGURES 1 and 2, the cut is defined by nearly straight parallel sides instead of by sloping sides as in conventional arc welding, and the penetration is such that by leaving the line of cut unobstructed on the side opposite to that against which the arc is directed the displaced metal, including that derived from the melting off of the electrode, will pass entirely through the plate. A clean cut closely following any desired line is thus obtainable, one that compares favorably with that obtained by the best flame cutting methods available.

The parts appearing in FIGURE 2 are there shown in approximately full scale, the operation represented being the one described above where a ⅜ inch steel plate is being cut with an arc struck from a metal electrode of 5/64 inch diameter. In such case the stick-out portion of the electrode will be approximately ¾ inch and the width of the resulting cut will be less than twice the weld rod diameter, such cut being defined by substantially straight, parallel side walls. While in this FIGURE 2 the end of the rod or wire W is shown in full lines as being approximately even with the upper surface of the plate being cut, it has been determined by observation that the more usual position of such end is that indicated by the extension of the rod in dotted lines, i.e. approximately even with the bottom of the cut, or in other words, with the lower surface of the plate.

The actual form of such end as well as the unique form of arc that is obtained under the stated conditions will be found diagrammatically illustrated in FIGURES 3 to 6 inc., such figures being side views of the arc as actually observed in operation.

As shown in each of said last-named figures, where the electrode rod or wire thus extends into the kerf, the active or arcing face thereof is at an angle sloping off 45° or less from the rod or wire axis in the direction of the kerf being cut. As also shown in each of said figures, the arc area or zone A encloses an interiorally located core which is distinguishable by its greater luminosity or brilliance from the remainder of such area or zone when viewed laterally from any angle, but particularly from a side at right angles to the direction in which the arc is moving. There is a noticeable absence of the drop formation and spatter, which, as previously noted, constitute familiar features in conventional arc welding with a metal electrode. It will be understood of course that the plate W' is supported so as to leave clear and unobstructed the under face thereof along the line to be cut.

Figure 4:
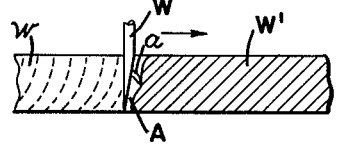
Figure 5:
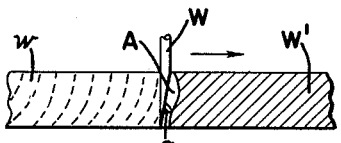
Figure 6:
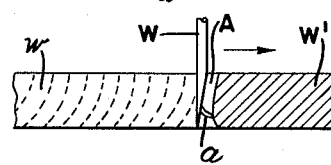

As further indicated in said FIGURES 3 to 6 inclusive, in cutting a plate of substantial thickness, e.g. the ⅜ inch plate illustrated, the arc, and more especially such core or jet $a$, travels up and down the portion of the electrode rod or wire that extends within the kerf. Such travel occurs along the sloping face of the rod or wire end, and at one time, as in FIGURE 3, the core or jet will project from the uppermost point or extremity of the rod toward the adjacent part of the end of the cut or kerf $w$ toward which the electrode is moving. However, as the cut is deepened at this point, the jet will be projected from successively lower points along the electrode, as illustrated in FIGURES 4 and 5, until, as illustrated in FIGURE 6, it approaches the lower surface of the plate, which is in turn cut away, thus preventing the electrode from shorting against such portion.

This clears the way for a repetition of the process. Apparently the movement of the jet up and down the edge of the advancing kerf corresponds with the cyclic variation of the arc voltage, although this has not been definitely established. Such upward movement, moreover, appears to be more rapid than the downward movement, and the cutting action to occur principally during the latter, with the result that slight curved striations (represented by the curved dotted lines on FIGURES 3 to 7 inc.) may be formed on the side walls of the cut.

The core portion $a$ of the arc is believed to be a vapor jet, i.e. it is composed of a stream of molecules, atoms and ions, which have a unidirectional mass motion. It arises from the hot, evaporating surface of the electrode end coincidental with the point of electrical contact with the arc plasma; another jet arises simultaneously from the plate but to a much lesser extent. In other words, such vapor jets are emitted from the cathode as well as the anode. However, in addition to polarity, the size of the jet is dependent upon the temperature and current density of the emitting surface, the surface area involved and the material itself. The jet and arc stream in the plasma are separate and distinct entities; they may coexist or diverge from their coincidental source on the electrode, the relative positions depending upon the forces at play within the arc.

The average particle speed in the direction of the jet is believed to be on the order of 2,000 meters per second, such speed depending upon the mass of the particle or atom of metal. The effect of the jet as a heat transfer medium depends upon the velocity, temperature and mass of the jet material impinging upon the base plate. In its effects, the jet may be regarded as a mechanical phenomenon and, as will be further pointed out, it has a remarkable and hitherto unrealized capacity for thermal transfer.

Thus the use of an electric arc characterized by the presence of a jet, as hereinbefore described, is believed to have significance beyond the superior metal cutting action of such arc. As previously stated, it is believed that such jet indicates the transfer in vaporous form of a substantial portion of the run-off from the metal electrode, or weld rod, in contradistinction to such transfer being in the form of drops of molten metal. Of the total heat required to melt a steel electrode, roughly six parts serve to bring the metal up to melting temperature as compared to one part required for latent heat of liquefaction. None of this heat which may be transferred in the molten state to the workpiece is available for melting a cut. It is only the very small amount of heat contained in the metal above its melting temperature which is effective in melting the workpiece. In the normal welding or low current arc the amount of this heat is very small. On the other hand, where the electrode metal is transferred in the form of a vapor, a very much larger amount of heat is applied to the workpiece, viz. that represented by the added heat units required to superheat the molten metal to its boiling point and the heat units required to convert it to the vapor state.

The metal vapor cutting jet is a stream of evaporated metal issuing at high speed normal to the electrode surface with small divergence. We have determined that at currents between 600 and 1500 amperes for voltages between 29 and 33 volts from 10 percent to 40 percent of a 5/64 inch diameter steel wire evaporates; the balance drips off the electrode as liquid metal.

The metal vapor cutting jet impinging on a workpiece is a supply of concentrated heat. One mole of iron vapor at 3000° Kelvin has 112,000 calories. At 5000° Kelvin it has 123,000 calories. At 6500° Kelvin it has 132,000 calories. Eighteen thousand calories are more than enough to melt one mole of iron initially at room temperature. In addition to the heat delivered by the metal vapor cutting jet, heat is produced in the kerf because the work plate is the negative terminal of the arc.

We believe that with such high density currents as we use, temperatures as high as 6500° Kelvin are probable in the center of the metal vapor cutting jet. Even temperatures of 10,000° Kelvin are likely.

When the metal vapor cutting jet impinges on the work plate some of the vapor condenses and releases heat to melt the work plate, forming the kerf. In order to utilize the metal vapor cutting jet to the best advantage the arc length must be short. Therefore the end of the electrode is kept in the kerf. In this position, the metal vapor jet has sufficient momentum to blow molten metal out of the kerf leaving the unmelted work metal exposed. If any oxides should form by incidental entrapment of air in the arc stream, they too are blown out. However, in our process no oxides are likely to be formed to any notable degree in the kerf.

The high rate of heat delivery to the work plate in our process enables us to inject heat into a surface so fast that only a small portion can be conducted away, even by materials of the highest heat diffusivity. Consequently, copper and aluminum can be cut readily and rapidly with little heat dissipation into the plate. This also enables us to cut steel more rapidly, since the steel is melted and thrown out before any appreciable amount of heat can be conducted into the massive workpiece.

In our experiments we have used a machine which automatically feeds the electrode. Using 500 amperes and a 5/64 inch electrode we have cut 3/8 inch steel plate having a temperature of 500° F. at speeds up to 32 inches per minute. By increasing the current to 800 amperes we have increased the top cutting speed to 65 inches per minute.

For cold 3/8 inch steel plate with a 5/64 inch diameter electrode and 33 volts, the following are typical high values of cutting speeds for our process as we have measured them: 620 amperes, 35 inches per minute; 1160 amperes, 86 inches per minute; 1800 amperes, 150 inches per minute; 2620 amperes, 235 inches per minute.

We have found that with our invention we can cut under water with no measurable change in cutting speed. For example, one-half inch 18–8 stainless steel can be cut under water at 125 inches per minute with a current of 1970 amperes with 5/64 inch wire. This proves that this method of cutting is not dependent upon oxygen. We have found it not to be necessary to use a flux of any kind, although the use of flux does not detrimentally restrict the process.

Our process of cutting is very simple to operate. Its only requirement on the operator is that he control the cutting speed. If the speed should be set too high so that the kerf does not clear, the operator may repeat the cut without loss of quality of the cut. It will readily cut through material varying in thickness with no special precautions.

Referring now to FIGURE 7 wherein apparatus embodying the present invention is shown somewhat schematically, a welding carriage 25 is supported for movement parallel to the surface of the workpiece W' on a beam or track 26. A travel motor 27 comprised of a field coil 28 and an armature 29 mounted on the carriage 25 drives wheels or rollers 30 for the purpose of propelling the carriage along this beam or track.

The electrode W is fed from an electrode reel 35 either mounted on the carriage 25 or separately therefrom through an electrode nozzle 36 by a pair of electrode feed rolls 37 powered by an electric motor 38, all forming part of the carriage 25. Obviously, the motor and feed rolls could be separately mounted and the electrode fed through a flexible tube.

The electrode nozzle 36 is electrically energized relative to the workpiece W' by a welding generator 40 comprised of a field coil 41, an armature 42, and a series field coil 43, through wires 44 connected to the nozzle 36 and wire 45 connected to the workpiece W'.

The field coil 41 is connected to a fixed source of 115 D.C. voltage, not shown, through a variable resistance 50 by which the output voltage of the armature may be readily varied. The generator 40 preferably has a drooping voltage characteristic in relation to the current as is known and conventional in the art. It may have a flat voltage characteristic if desired by properly connecting the series coil 43 as will appear.

The armature 29 of the travel motor 27 is connected between the workpiece W' and the electrode nozzle 36 through a variable resistance 52. The field coil 28 of this motor is connected to a fixed source of D.C. voltage, not shown. Thus, the speed of the motor 27 will be proportional to the voltage between the electrode and the workpiece W' i.e. the arc voltage. The resistor 52 is employed for adjusting the speed of the travel motor 27 either during or before a cutting operation.

In this embodiment of the invention, the electrode feed motor 38 is preferably energized from a separate power source which is independent of the arc voltage. Thus, the speed of the electrode wire may be preset to any constant value.

An arc voltage of 28 to 29 volts has been found to give the best results with a steel workpiece and a steel electrode. If the arc voltage is allowed to increase beyond this value, the arc tends to travel around from the side of the electrode facing the direction of movement to the transverse sides. A wider cut results as well as the formation of a burr on the under side of the workpiece. Obviously, the invention is not limited to such an arc voltage and any voltage which gives a satisfactory cut and cutting speed may be employed. In particular, this voltage will vary for different metals and different conditions artificially induced into and about the arc.

For any given setting of the welding generator 40, the arc voltage is a function of the travel speed. If the travel speed is increased, the arc voltage decreases and vice versa. Thus, the resistor 52 is adjusted to vary the travel speed until the desired arc voltage is obtained. Thereafter as the arc voltage tends to vary for any reason, the speed of the carriage travel motor will automatically vary to compensate for such tendencies of the arc voltage to vary, and the arc voltage will thus be stabilized. Electronic control may be employed if desired.

The wire feed speed must be in direct relationship to the burnoff rate of the electrode, which burnoff rate is in turn a function of the current. Thus, after adjusting the welding generator 40 and the travel speed as above indicated to provide the desired arc voltage and arc current, the speed of the electrode feed motor 38 is adjusted so as to feed the electrode W towards the workpiece so that its lower end is always adjacent to the lower edge or surface of the workpiece. If the wire feed speed is too low, then the lower end of the electrode will be above the lower surface of the workpiece, and the workpiece will not be cut completely through. If the wire feed speed is too great, and the electrode end extends below the lower surface of the workpiece and the electrode is not completely consumed, this metal is wasted. If the wire feed speed is substantially too high, there is a chance that the arc will be drawn out at the lower edge of the plate to such a length that it will be extinguished.

For normal operation a definite ratio of wire feed speed to travel speed in a sideward direction for various currents have been found. Such relationships for a bare 5/64 steel wire and an arc voltage of 28 are as follows:

| Amps | Ratio Travel Speed to Current | Wire Feed Speed, in/min | Travel Speed, in/min | Ratio WFS to Travel |
|---|---|---|---|---|
| 600 | .426 | 330 | 25.6 | 12.9 |
| 800 | .438 | 440 | 35 | 11 |
| 1,000 | .530 | 590 | 53 | 11.1 |
| 1,200 | .575 | 880 | 69 | 12.75 |
| 1,400 | .578 | 940 | 81 | 11.6 |
| 1,600 | .625 | 960 | 100 | 9.6 |
| 1,800 | .678 | 1,100 | 122 | 8.65 |
| 2,000 | .715 | 1,100 | 143 | 7.7 |

From this table, it will be noted that the optimum wire feed speed is almost in direct proportion to the current, while the ratio of cutting speed to arc current increases very substantially as the arc current increases.

With this arrangement it will be appreciated that the travel speed of the carriage is proportional to the arc voltage, while the wire feed speed is independent of the electrode voltage. The present apparatus may be distinguished from other welding apparatus in this respect. Normally, the carriage travel speed is independent of the arc current or voltage, while the wire feed speed is made dependent on either arc current or arc voltage, or both.

From the above table it will be noted that the wire feed speed is almost directly proportional to the arc cutting current. It is possible in accordance with the invention to control the operation of the electrode feed motor 38 from the arc current so that the operator need only adjust the output voltage of the welding generator 40 and the carriage travel speed. The wire feed speed will then automatically adjust itself to any cutting current to maintain the desired relationship of the electrode end to the lower surface of the workpiece above pointed out.

Alternatively, a welding generator having a constant voltage output of an optimum value can be employed. Travel speed then determines the arc current which can readily be controlled using the resistor 52. The travel motor can be independently energized. Alternatively the speed of the travel motor 27 can be made inversely proportional to the cutting current rather than to the arc voltage as above described with reference to a drooping voltage output. As the cutting current tended to then increase for any reason, such as an increase in the thickness of the workpiece being cut, the travel speed would be automatically slowed down an amount to bring the arc current back to its preadjusted desired value. In the alternative, if the cutting current went down the cutting speed would then be automatically increased to bring the cutting current back to its normal preadjusted value.

In such an arrangement the wire feed motor could either be energized from a fixed voltage source, or its speed could be made variable in direct relation to the cutting current, as above described.

Our process and apparatus has a wide range of applicability. We have used it successfully to cut aluminum, copper, stainless steel, SAE 1020 steel and cast iron.

While reference has been made above to arc cutting using a metallic electrode composed of mild steel, electrodes composed of other metals have been found satisfactory, or in some respects superior. For example, where a molybdenum electrode is employed, the melt-off rate of the electrode is roughly only half that of steel without any reduction in the cutting speed. Electrodes composed of aluminum and of copper, have likewise been successfully utilized, not only to cut a part composed of the same metal as that of the electrode but steel parts, including stainless steel, as well. In addition to aluminum and copper, we have also successfully used the following materials for electrodes, viz. nickel, 18–8 stainless steel, SAE 1095 steel and SAE 1010 steel. The fact that stainless steel, copper and aluminum have never been successfully cut by means of the gas torch may be cited as further evidence of the superior efficiency of the instrumentality we have discovered.

Our process produces very small heat affected regions. In cutting 3/8 inch SAE 1020 steel the heat affected zone has a thickness of approximately 0.003 inch. In stainless steel the cut is through the grains, not along grain boundaries.

Warpage and stress are reduced by our process. These conditions result from the local gain and loss of heat. Our cutting process throws metal out of the kerf as soon as it melts, and cuts very rapidly. Consequently, very little high temperature metal is in contact with the workpiece at any time. Also, the time that a particular locality of the workpiece is subject to high temperature is very short. The result is that very little heat is conducted into the workpiece. The conclusive evidence that little heat is left in the workpiece is the steep temperature gradient noted previously. Because the net heat input is low, both warpage and stress are low.

While, as shown in the drawings and set forth in the preceding portion of this specification, our improved method of cutting metal by means of the electric arc is primarily designed for cutting entirely through, i.e. completely severing a sheet, plate, or other metal workpiece, and with this in view such workpiece will ordinarily be supported with the line of cut unobstructed on both sides, the penetrating action of the novel form of arc which we obtain is not necessarily limited in use to thus cutting entirely through the metal part. For example, by applying such arc, having the characteristic jet action as described, to the under side of a plate or like metal part, a slot may be cut therein much the same as by a mechanical milling operation. Indeed, such a slot may be cut on the upwardly directed side of the workpiece or part, it being a matter of indifference whether the slot be filled up later by weld metal.

While for the purpose of cutting, the electrode, as hereinbefore set forth, is preferably positive, a negative electrode may be utilized in carrying out our method although not as effectively as such positive electrode. In other words, a metal vapor jet under the prescribed conditions may be caused to issue from a negative electrode by the arc, although for an equivalent jet intensity such negative electrode will require a somewhat higher current density.

Finally, the maximum current density that may be used with our cutting arc may considerably exceed the specific examples hereinabove given; thus the current density may range from 60,000 to 500,000 amperes per square inch of electrode cross-section, or in other words, the electric current employed in the case of the illustration electrode wire of approximately 1/16 inch diameter may range from 150 to 2500 amperes, provided the rate of feed of the electrode to the workpiece is correspondingly increased.

In the following claims the metallic electrode used in our process is referred to as a "bare" electrode to indicate the absence of any electrically non-conductive refractory coating such as has heretofore been generally considered necessary to the utilization of the arc from such an electrode in a metal cutting operation. Similarly the term "jet action arc" as used in the claims will be understood to connote an arc having the distinguishing characteristics hereinbefore fully set forth. The presence of the vapor jet which characterizes such arc is a demonstrable phenomenon which serves readily to distinguish such jet action arc from those previously utilized in metal cutting operations where the core, if observed at all, has been composed merely of discrete molten particles or droplets.

The invention has been described in detail with specific reference to preferred embodiments. Obviously modifi-

Having thus described our invention, we claim:

1. The method of cutting a metal workpiece using an electric arc comprising moving a consumable elongated, bare, electrically-energized electrode until a side of the electrode spaced from the end thereof contacts the workpiece and an arc is struck between such side and the workpiece and, thereafter, moving the electrode sidewardly in the desired direction of the cut at a rate sufficient to maintain the arc between the forward side only of the electrode and the apex of the cut to melt away the apex in advance of such electrode while simultaneously feeding the electrode lengthwise at a rate sufficient to maintain the electrode within the cut thus formed to at least substantially the full depth thereof, the electric energization of the electrode relative to the workpiece being such that the electrode is continuously melted away and the heated electrode metal thus formed is carried to the apex and assists the arc in the cutting action.

2. The method of cutting a metal workpiece using an electric arc comprising moving an elongated consumable bare metal electrically-energized electrode until a side of the electrode spaced from the end contacts the workpiece and an arc is struck between such side and the workpiece and, thereafter, moving the electrode sidewardly in the desired direction of the cut while simultaneously feeding the electrode lengthwise to cut the workpiece, the rates of movement being such that the electrode is always within the cut thus formed to at least substantially the full depth thereof with the arc oscillating over that portion of the electrode within the cut and the arc is maintained between the forward side only of the electrode and the apex of the cut to melt away the apex in advance of such electrode, the electric energization of the electrode relative to the workpiece being such that the electrode is continuously melted away and the heated electrode metal thus formed is carried to the apex and assists the arc in the cutting action.

3. The method of cutting a metal workpiece using an electric arc comprising moving an elongated consumable bare electrically-energized electrode sidewardly in the desired direction of the cut at a rate sufficient to maintain the arc between the forward side only of the electrode and the apex of the cut to melt away the apex in advance of such electrode and simultaneously feeding the electrode at a rate sufficient to maintain the electrode within the cut thus formed to at least substantially the full depth thereof, the electric energization of the electrode relative to the workpiece being such that the electrode is continuously melted away and the heated electrode metal assists the arc in melting away the workpiece.

4. The method of cutting a metal workpiece using an electric arc comprising moving an elongated bare metal electrically-energized electrode sidewardly in the desired direction of the cut at a rate sufficient to maintain the arc between the forward side only of the electrode and the apex of the cut to melt away the apex in advance of such electrode and simultaneously feeding the electrode at a rate sufficient to maintain the electrode within the cut thus formed to at least substantially the full depth thereof and with the arc oscillating over the portion of the electrode within the cut, the electric energization of the electrode relative to the workpiece being such that the electrode is continuously melted away and the heated electrode metal assists the arc in melting away the workpiece.

5. The method of cutting a metal workpiece using an electric arc comprising moving a consumable elongated, bare, electrically-energized electrode until a side of the electrode spaced from the end thereof contacts the workpiece and an arc is struck between such side and the workpiece and, thereafter, moving the electrode sidewardly in the desired direction of the cut at a rate sufficient to maintain the arc between the forward side only of the electrode and the apex of the cut to melt away the apex in advance of such electrode while simultaneously feeding the electrode lengthwise at a rate sufficient to maintain the electrode within the cut thus formed to at least substantially the full depth thereof, the electric energization of the electrode relative to the workpiece being such that the electrode temperature is continuously raised to the vaporization point and the arc causes the metal vapor thus formed to impinge on the apex of the cut and impart the latent heat of vaporization to the workpiece.

6. The method of cutting a metal workpiece using an electric arc comprising moving a consumable elongated, bare, electrically-energized electrode until a side of the electrode spaced from the end thereof contacts the workpiece and an arc is struck between such side and the workpiece and, thereafter, moving the electrode sidewardly in the desired direction of the cut at a rate sufficient to maintain the arc between the forward side only of the electrode and the apex of the cut to melt away the apex in advance of such electrode while simultaneously feeding the electrode lengthwise at a rate sufficient to maintain the electrode within the cut thus formed to at least substantially the full depth thereof, the electric energization of the electrode relative to the workpiece being such that the current density in the electrode is in excess of 60,000 amperes per square inch.

7. The method of cutting a metal workpiece using an electric arc comprising moving an elongated, bare, metal electrically-energized electrode sidewardly in the desired direction of the cut at a rate sufficient to maintain the arc between the forward side only of the electrode and the apex of the cut to melt away the apex in advance of such electrode and simultaneously feeding the electrode at a rate sufficient to maintain the electrode within the cut thus formed to at least substantially the full depth thereof and with the arc oscillating over the portion of the electrode within the cut, the electric energization of the electrode relative to the workpiece being such that the electrode temperature is continuously raised to the vaporization point and the arc causes the metal vapor thus formed to impinge on the apex of the cut and impart the latent heat of vaporization to the workpiece.

8. The method of cutting a metal workpiece using an electric arc comprising moving an elongated, bare, metal electrically-energized electrode sidewardly in the desired direction of the cut at a rate sufficient to maintain the arc between the forward side only of the electrode and the apex of the cut to melt away the apex in advance of such electrode and simultaneously feeding the electrode at a rate sufficient to maintain the electrode within the cut thus formed to at least substantially the full depth thereof and with the arc oscillating over the portion of the electrode within the cut, the electric energization of the electrode relative to the workpiece being such that the current density in the electrode is in excess of 60,000 amperes per square inch.

9. Apparatus for cutting a metal workpiece using an electric arc and a consumable bare, elongated, metallic electrode comprising means for moving said metallic electrode until a side of the electrode spaced from the end thereof, contacts the workpiece and an arc is struck between the side and the workpiece and for thereafter moving the electrode sidewardly in the desired direction of the cut at a rate proportional to the arc voltage and sufficient to maintain the arc between the forward side only of the electrode and the apex of the cut to melt away the apex in advance of the electrode, motor means for simultaneously feeding the electrode uni-directionally lengthwise at a rate sufficient to maintain the electrode within the cut thus formed to at least substantially the full depth thereof, and means for electrically energizing the electrode relative to the workpiece such that the electrode is continuously melted away and the heated electrode metal thus formed is carried to the apex and assists the arc in the cutting action.

10. The method of claim 8 wherein the rate of sideward movement of the electrode is varied so as to maintain the voltage between the electrode and the workpiece generally constant.

11. The combination of claim 8 wherein the rate of feeding the electrode is varied in proportion to the electrode current.

12. The combination of claim 8 wherein the rate of sideward movement of the electrode is varied so as to maintain the arc voltage at a generally constant value and the rate of feeding of the electrode is proportional to the arc current.

References Cited in the file of this patent
UNITED STATES PATENTS

| | | |
|---|---|---|
| 1,508,738 | Whiting | Sept. 16, 1924 |
| 1,636,104 | Murray | July 19, 1927 |
| 1,746,208 | Alexander | Feb. 4, 1930 |
| 1,827,245 | Lincoln | Oct. 13, 1931 |
| 2,284,351 | Wyer | May 26, 1942 |
| 2,381,355 | Laughton | Aug. 7, 1945 |
| 2,438,344 | Meincke | Mar. 23, 1948 |
| 2,504,868 | Muller | Apr. 18, 1950 |